(12) United States Patent
Orito

(10) Patent No.: US 10,057,086 B2
(45) Date of Patent: *Aug. 21, 2018

(54) TERMINAL APPARATUS, CONTENT TRANSMISSION METHOD, AND CONTENT PLAYBACK SYSTEM

(71) Applicant: SONY CORPORATION, Tokyo (JP)

(72) Inventor: Kunihiro Orito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/378,525

(22) Filed: Dec. 14, 2016

(65) Prior Publication Data

US 2017/0093599 A1    Mar. 30, 2017

Related U.S. Application Data

(63) Continuation of application No. 14/150,288, filed on Jan. 8, 2014, now Pat. No. 9,548,084.

(30) Foreign Application Priority Data

Jan. 18, 2013  (JP) ................... 2013-007884

(51) Int. Cl.
| | |
|---|---|
| *H04N 5/765* | (2006.01) |
| *H04L 12/66* | (2006.01) |
| *H04L 12/46* | (2006.01) |
| *H04L 29/06* | (2006.01) |
| *H04L 12/40* | (2006.01) |

(52) U.S. Cl.
CPC .......... *H04L 12/66* (2013.01); *H04L 12/4625* (2013.01); *H04L 65/1023* (2013.01); *H04L 65/4069* (2013.01); *H04L 2012/40215* (2013.01); *H04L 2012/40273* (2013.01)

(58) Field of Classification Search
CPC ............................. G11B 27/105; H04L 67/12
See application file for complete search history.

(56) References Cited

U.S. PATENT DOCUMENTS

| | | | |
|---|---|---|---|
| 9,548,084 B2* | 1/2017 | Orito | ......................... H04N 5/76 |
| 2008/0013752 A1 | 1/2008 | Stephens | |
| 2008/0162147 A1 | 7/2008 | Bauer | |
| 2013/0145482 A1 | 6/2013 | Ricci et al. | |

FOREIGN PATENT DOCUMENTS

| | | | |
|---|---|---|---|
| JP | 2005-203943 A | 7/2005 |
| JP | 2010-073105 A | 4/2010 |
| JP | 4680984 B2 | 2/2011 |

* cited by examiner

*Primary Examiner* — Hung Dang
*Assistant Examiner* — Girumsew Wendmagegn
(74) *Attorney, Agent, or Firm* — Chip Law Group

(57) ABSTRACT

A terminal apparatus includes: by way of a gateway apparatus configured to perform communication with an in-vehicle apparatus capable of playing back a content through a CAN bus, a first communication section configured to transmit command information for changing a mode of the in-vehicle apparatus to the in-vehicle apparatus; and a second communication section configured to transmit content data to the in-vehicle apparatus.

14 Claims, 13 Drawing Sheets

TERMINAL APPARATUS, CONTENT TRANSMISSION METHOD, AND CONTENT PLAYBACK SYSTEM

CROSS REFERENCE TO RELATED APPLICATIONS

The present application is a continuation application of U.S. patent application Ser. No. 14/150,288, filed Jan. 8, 2014, and claims the priority from prior Japanese Priority Patent Application JP 2013-007884 filed Jan. 18, 2013, the entire contents of which are incorporated herein by reference.

BACKGROUND

The present technique relates to a terminal apparatus, a content transmission method, a content transmission program, and a content playback system.

In recent years, mobile terminal apparatuses, such as a mobile phone, a smart phone, and the like, that have a large variety of applications for providing various services and functions have become widespread. And in order to improve convenience by the applications furthermore, it is desired that those mobile terminal apparatuses cooperate with the other apparatuses and the other networks. For example, proposals have been made of a vehicle communication system and a gateway apparatus that allow general mobile terminals to connect to an in-vehicle network (Japanese Unexamined Patent Application Publication No. 2005-236560).

SUMMARY

However, in the technique described in Japanese Unexamined Patent Application Publication No. 2005-236560, there has been a problem in that significant roles are demanded for a conversion machine between an in-vehicle network and a wireless communication (for example, a device that is referred to as a gateway, and so on). For example, it is necessary to obtain content lists held by both of the devices in order to keep information, and to provide the content lists. Also, if a request has been received from one of the devices, it is necessary to obtain a content from the other device, to temporarily hold the content, and to transmit the content to the requesting device. Although device performance is dependent on a content compression ratio, and so on of a gateway, a gateway that plays such roles have a problem in that higher device performance is generally demanded of the gateway than a gateway that only transfers commands. Accordingly, the gateway necessarily becomes expensive. Also, there is a risk of becoming difficult to fully support a content that includes a high-quality sound and a high-quality image.

The present technique has been made in view of these points. It is desirable to provide a terminal apparatus, a content transmission method, a content transmission program, and a content playback system that make it possible to transmit and receive a content without increasing demands for a gateway.

According to an embodiment of the present disclosure, there is provided a terminal apparatus including: by way of a gateway apparatus configured to perform communication with an in-vehicle apparatus capable of playing back a content through a CAN bus, a first communication section configured to transmit command information for changing a mode of the in-vehicle apparatus to the in-vehicle apparatus; and a second communication section configured to transmit content data to the in-vehicle apparatus.

According to another embodiment of the present disclosure, there is provided a method of transmitting a content, the method including: by way of a gateway apparatus configured to perform communication with an in-vehicle apparatus capable of playing back a content through a CAN bus, transmitting command information for changing a mode of the in-vehicle apparatus to the in-vehicle apparatus; and transmitting content data to the in-vehicle apparatus.

According to another embodiment of the present disclosure, there is provided a content transmission program for causing a computer to perform a method of transmitting a content, the method including: by way of a gateway apparatus configured to perform communication with an in-vehicle apparatus capable of playing back a content through a CAN bus, transmitting command information for changing a mode of the in-vehicle apparatus to the in-vehicle apparatus; and transmitting content data to the in-vehicle apparatus.

According to another embodiment of the present disclosure, there is provided a content playback system including: a terminal apparatus including to a gateway apparatus configured to perform communication with an in-vehicle apparatus capable of playing back a content through a CAN bus, a first communication section configured to transmit command information for changing a mode of the in-vehicle apparatus, and a second communication section configured to transmit content data to the in-vehicle apparatus; a gateway apparatus configured to transmit the command information transmitted from the terminal apparatus to the in-vehicle apparatus; and an in-vehicle apparatus configured to play back the content data transmitted from the terminal apparatus.

By the present technique, it is possible to transfer a content through an in-vehicle network without increasing demands on a gateway.

DETAILED DESCRIPTION OF EMBODIMENTS

Figure 1:
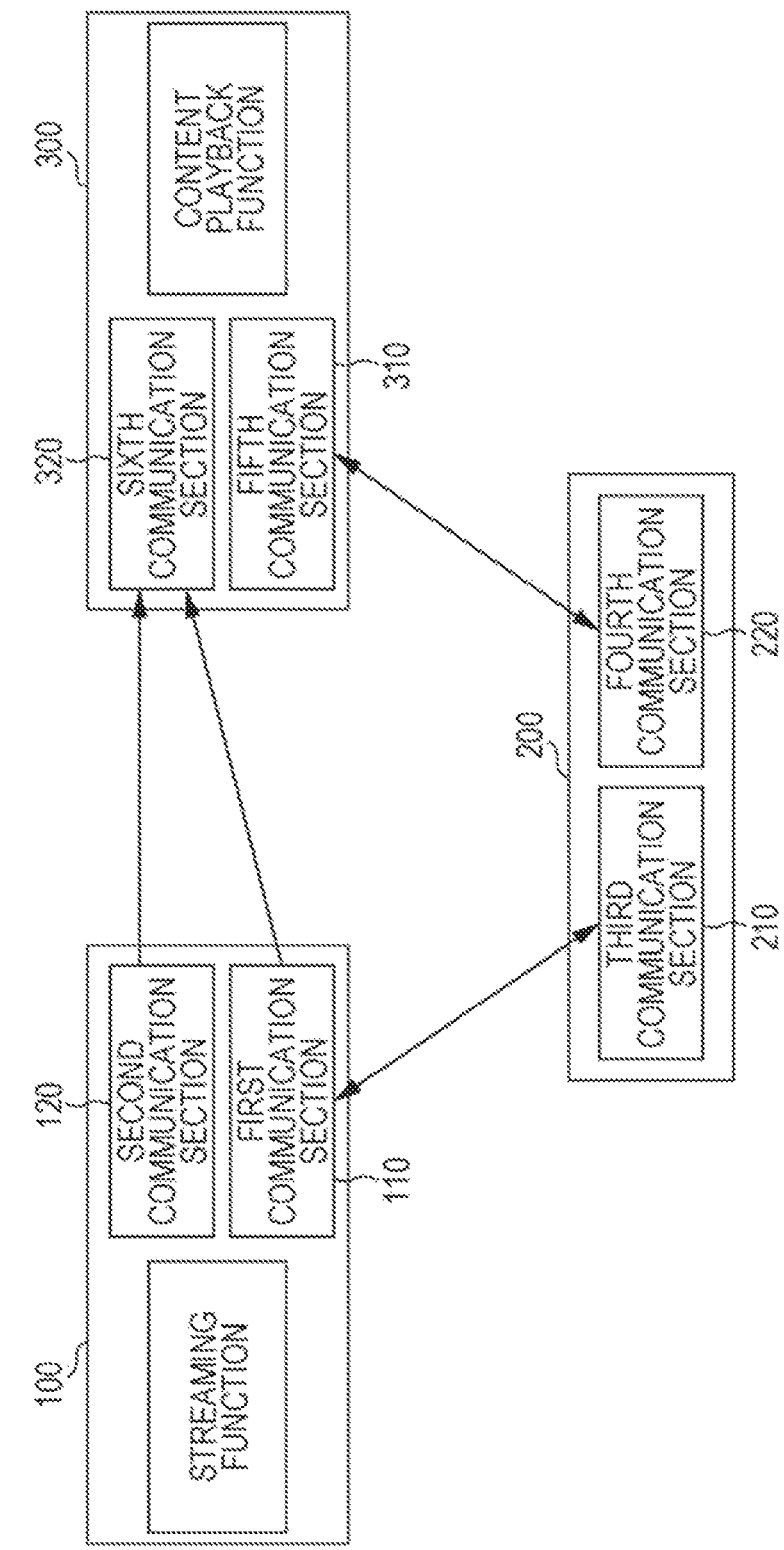
FIG. 1 is a block diagram illustrating a configuration of a content playback system according to the present technique.

In the following, descriptions will be given of embodiments of the present technique with reference to the drawings. However, the present technique is not limited to the following embodiments. In this regard, the descriptions will be given in the following order.
1. First Embodiment
1.1 Configuration of content playback system
1.2 Configuration of terminal apparatus
1.3 Configuration of gateway apparatus
1.4 Configuration of car audio apparatus
1.5 Processing in content playback system
2. Second Embodiment
2.1 Configuration of terminal apparatus
2.2 Configuration of car audio apparatus
2.3 Processing in content playback system
3. Third Embodiment
3.1 Configuration of terminal apparatus
3.2 Processing in content playback system
4. Variations
1. First Embodiment
1.1 Configuration of Content Playback System FIG. 1 is a block diagram illustrating a schematic configuration of a content playback system 10 according to the present technique. The content playback system 10 includes a terminal apparatus 100, a gateway apparatus 200, and a car audio apparatus 300, which is an in-vehicle apparatus.

In the terminal apparatus 100, a content streaming application has been installed, and the terminal apparatus 100 has a function of streaming a content, such as music, a moving image, a still image, and the like. The terminal apparatus 100 has a wired or/and wireless communication functions. For the terminal apparatus 100, for example, a mobile phone, a smart phone, a mobile music player, a tablet terminal, a personal computer, a digital camera, and the like are provided.

The gateway apparatus 200 is a network apparatus that performs data transfer between the terminal apparatus 100 and the car audio apparatus 300. The gateway apparatus 200 is connected to a car audio apparatus 300 through an in-vehicle Local Area Network (LAN) called Controller Area Network (CAN). CAN is one of network standards used for mutual communications between devices in a vehicle, and the like. A serial communication method called a CAN bus method is employed in CAN. CAN has a characteristic which is excellent in noise resistance, highly reliable, and allows setting of a maximum transfer speed to about 1 Megabits per second (Mbps), and so on. A plurality of devices, apparatuses (nodes) are connected to a CAN bus, and each node performs data transmission and reception through a CAN bus. Individual nodes include, for example a plurality of Electronic Control Units (ECUs) that control individual parts of a vehicle.

The car audio apparatus 300 is mounted in a vehicle, such as an automobile, and so on, and has a function of playing back a content, such as music, a moving image and the like. The car audio apparatus 300 has a wired or/and wireless communication function.

In the present embodiment, all of the terminal apparatus 100, the gateway apparatus 200, and the car audio apparatus 300 are assumed to individually include communication modules that allow at least two kinds of communication methods or more. The terminal apparatus 100, the gateway apparatus 200, and the car audio apparatus 300 are mutually connected, and are capable of transmitting and receiving data. A content is directly transmitted from the terminal apparatus 100 to the car audio apparatus 300. In this regard, each apparatus may be connected through either wireless communication or wired communication. A detailed description will be given later of the configuration of each apparatus.

1.2 Configuration of Terminal Apparatus

Figure 2:
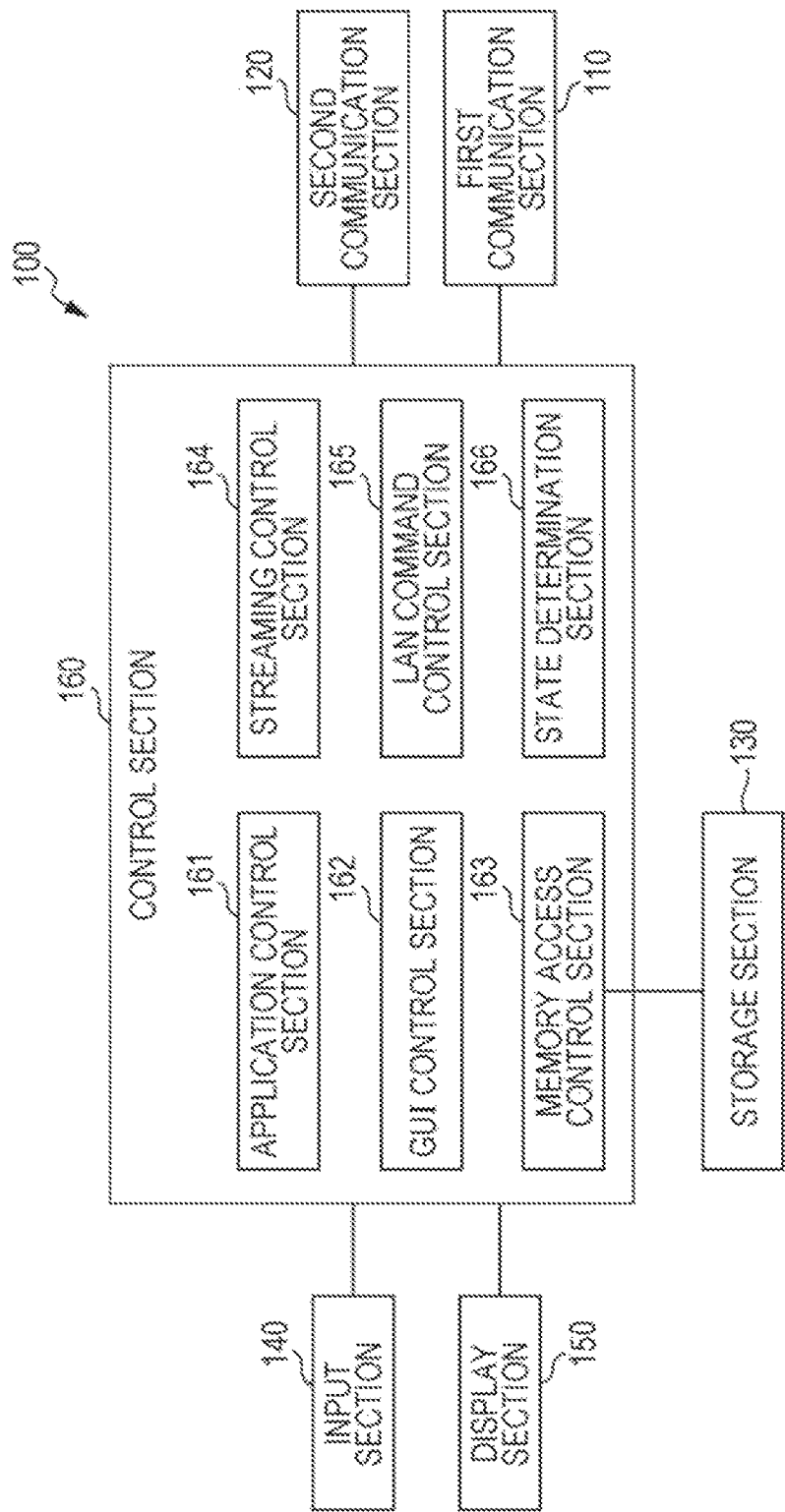
FIG. 2 is a block diagram illustrating a configuration of a terminal apparatus according to a first embodiment.

Next, a description will be given of the terminal apparatus 100 included in the content playback system 10. FIG. 2 is a block diagram illustrating a configuration of the terminal apparatus 100. The terminal apparatus 100 includes a first communication section 110, a second communication section 120, a storage section 130, an input section 140, a display section 150, and a control section 160.

The first communication section 110 is a communication module that performs data transmission and reception with the gateway apparatus 200 and the car audio apparatus 300 using a predetermined communication method. The communication method includes Wireless Fidelity (Wi-Fi), a wireless LAN, a 3G network, Long Term Evolution (LTE), and so on. In this regard, in the present embodiment, a description will be given on the assumption that the first communication section 110 performs communication using Wi-Fi.

The second communication section 120 is a communication module that performs data transmission and reception with the car audio apparatus 300 using a predetermined communication method. The communication method includes, for example Bluetooth, Wi-Fi, a wireless LAN, a 3G network, LTE (Long Term Evolution), and so on. In this regard, in the present embodiment, a description will be given on the assumption that the second communication section 120 performs communication using Bluetooth.

By communication through the first communication section 110 and the second communication section 120, it becomes possible for the terminal apparatus 100 to connect to the Internet, and to perform communication with the other apparatuses. In this regard, the communication method is not limited to the above-described wireless communication method, and may be a wired communication, such as a Universal Serial Bus (USB) connection, a LAN cable connection, or the like. Also, as long as a method enables data communication, any method other than the above-described communication methods may be employed. The communication method may be suitably selected on the basis of the model of the terminal apparatus 100, the kind of Operation System (OS), and the like. In this regard, in the present embodiment, it is assumed that the first communication section 110 performs communication by Wi-Fi, and the second communication section 120 performs communication using Bluetooth.

The storage section 130 is constituted by a large-capacity storage medium, such as an Hard Disc Drive (HDD), an Solid State Drive (SSD), a nonvolatile memory, and so on, for example. The storage section 130 stores content data, such as sound, moving images, and so on, applications, and various kinds of data that are necessary for operation of the terminal apparatus 100. The storage section 130 may be an external storage medium that is detachable from the terminal apparatus 100, an SD memory card, or the like, for example.

In this regard, in the present embodiment, a description has been given of the case where a content that is transmitted from the terminal apparatus 100 to the car audio apparatus 300 and is played back by the car audio apparatus 300 is an audio content, such as music, or the like as an example. However, a content that is transmitted from the terminal apparatus 100 to the car audio apparatus 300 and is played back by the car audio apparatus 300 is not limited to an audio content, and may be the other content, such as a moving image content, an image content, and so on.

The input section 140 is an input mechanism for the user to perform various kinds of input to the terminal apparatus 100. For example, the input section 140 is formed by a button, a touch panel, a switch, or the like. Also, the input section 140 may be formed as a touch screen, which is integrated with the display section 150. When a user performs input operation on the input section 140, the input section 140 generates a control signal corresponding to the input, and outputs the control signal to the control section 160. And the control section 160 performs calculation processing and control corresponding to the control signal.

The display section 150 is a display mechanism constituted by, for example an Liquid Crystal Display (LCD), a Plasma Display Panel (PDP), an organic Electro Luminescence (EL) panel, or the like. On the display section 150, a home screen on which a menu of various operations of the terminal apparatus 100 is displayed, a content list, information (an artist name, a music name, and so on) on an audio content being played back, a moving image content, an image content, and the like are displayed.

The control section 160 includes, for example, a Central Processing Unit (CPU), a Random Access Memory (RAM) and a Read Only Memory (ROM), and so on. The ROM stores a program, which is read and operated by the CPU, and the like. The RAM is used for a work memory of the CPU. The control section 160 executes streaming applications so as to function as an application control section 161, a Graphical User Interface (GUI) control section 162, a memory access control section 163, a streaming control section 164, an in-vehicle LAN command control section 165, and a state determination section 166.

The present technique is achieved by an application processor, such as the control section 160, and so on executing the application program installed in the terminal apparatus 100. However, the present technique is not achieved only by an application program, but may be achieved by a combination of individual pieces of hardware having functions of the application control section 161, the GUI control section 162, the memory access control section 163, the streaming control section 164, the in-vehicle LAN command control section 165, and the state determination section 166.

The application control section 161 manages and controls the entire function of the application. When a user inputs an instruction to operate in a streaming mode to the input section 140, the application control section 161 changes the terminal apparatus 100 to the streaming mode in accordance with the instruction.

The GUI control section 162 generates a GUI menu for combining various kinds of images to be displayed on the display section 150, and supplies the GUI menu to the display section 150. Thereby, various kinds of menus, and icons, and so on are displayed on the display section 150 in order for the user to use the present technique.

The memory access control section 163 reads various kinds of data, such as content data, and so on from the storage section 130 in accordance with an instruction from the application control section 161.

The streaming control section 164 converts the content data read from the storage section 130 into a predetermined data format on the basis of a streaming method, and supplies the content data to the second communication section 120. The content data is transmitted to the car audio apparatus 300 through the second communication section 120.

The in-vehicle LAN command control section 165 generates a predetermined command for the car audio apparatus 300 to make a transition to the streaming playback mode, and supplies the command to the first communication section 110. The command is transmitted to the gateway apparatus 200 through the first communication section 110.

The state determination section 166 receives the command transmitted from the terminal apparatus 100 through the gateway apparatus 200, and determines whether the car audio apparatus 300 has changed to the streaming playback mode. The car audio apparatus 300 notifies a state of itself on the CAN bus all the time. Accordingly, the terminal apparatus 100 is allowed to check the mode of the car audio apparatus 300 by monitoring communication on the CAN bus through the gateway apparatus 200. Thereby, it is possible to confirm that the car audio apparatus 300 has become the streaming playback mode, and the input sound source of the car audio apparatus 300 has become the streaming sound source from the terminal apparatus 100.

The terminal apparatus 100 is configured as described above.

1.3 Configuration of Gateway Apparatus

Figure 3:
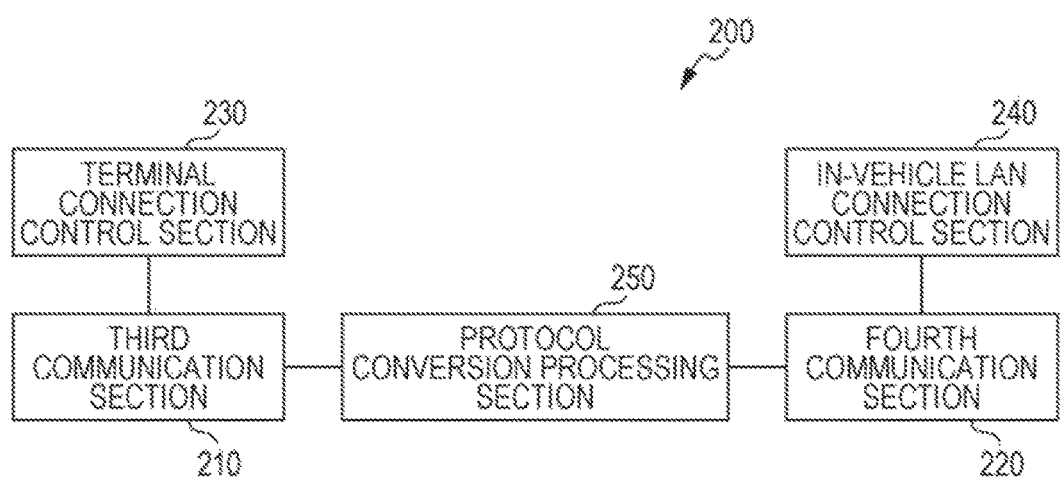
FIG. 3 is a block diagram illustrating a configuration of a gateway apparatus.

Next, a description will be given of the configuration of the gateway apparatus 200 with reference to FIG. 3. FIG. 3 is a block diagram illustrating the configuration of the gateway apparatus 200. The gateway apparatus 200 includes a third communication section 210, a fourth communication section 220, a terminal connection control section 230, an in-vehicle LAN connection control section 240, and a protocol conversion processing section 250.

The third communication section 210 performs data transmission and reception with the terminal apparatus 100 using a predetermined communication method. The communication method includes Wi-Fi, a wireless LAN, a 3G network, LTE, and so on. In this regard, in the present embodiment, a description will be given on the assumption that the third communication section 210 performs communication using Wi-Fi.

The fourth communication section 220 is connected to the CAN bus of the in-vehicle LAN, and is a CAN communication module for performing communication with the car audio apparatus 300. In this manner, the gateway apparatus 200 has a CAN communication function and a wired and/or a wireless communication function.

The terminal connection control section 230 performs predetermined processing, such as management of an Service Set Identifier (SSID), which is an access point identifier, a Wired Equivalent Privacy (WEP) password, a password corresponding to a network name, and the like, checking, authentication, and so on in order for the third communication section 210 to perform communication with the terminal apparatus 100.

The in-vehicle LAN connection control section 240 performs connection control on the fourth communication section 220 for connecting to CAN, which is an in-vehicle LAN, so that the fourth communication section 220 connects to the in-vehicle LAN.

The protocol conversion processing section 250 performs predetermined conversion processing so as to transmit the command transmitted from the terminal apparatus 100 to the car audio apparatus 300. A description will be given of this point with reference to FIG. 4.

Figure 4:
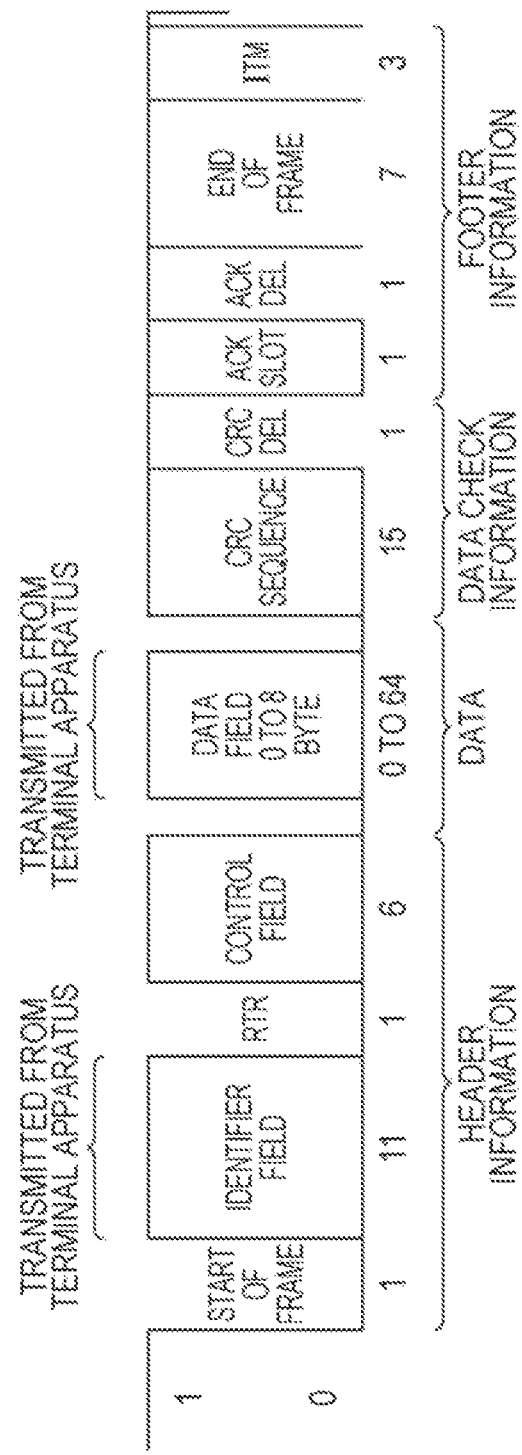
FIG. 4 is an explanatory diagram of a format of data transmitted from a gateway apparatus to a car audio apparatus.

As illustrated in FIG. 4, data corresponding to "Identifier Field" and "Data Field 0-8 Byte" are transmitted from the terminal apparatus 100 to the gateway apparatus 200 as command data. When the gateway apparatus 200 receives the data, the protocol conversion processing section 250 adds information other than "Identifier Field" and "Data Field 0-8 Byte", which are illustrated in FIG. 4. The information to be added includes data check information, footer information, and the like. And the gateway apparatus 200 supplies a packet including the additional information other than "identifier Field" and "Data Field 0-8 Byte" to the CAN bus so as to transmit the packet to the car audio apparatus 300.

Also, the protocol conversion processing section 250 monitors the packet transmitted from the car audio apparatus 300 on the in-vehicle LAN, and extracts parts corresponding to "Identifier Field" and "Data Field 0-8 Byte" to transmit the parts to the terminal apparatus 100. It is possible for the state determination section 166 of the terminal apparatus 100 to determine whether the mod of the car audio apparatus 300 has been changed or not using the transmitted data.

The gateway apparatus 200 is configured as described above.

1.4 Configuration of Car Audio Apparatus

Figure 5:
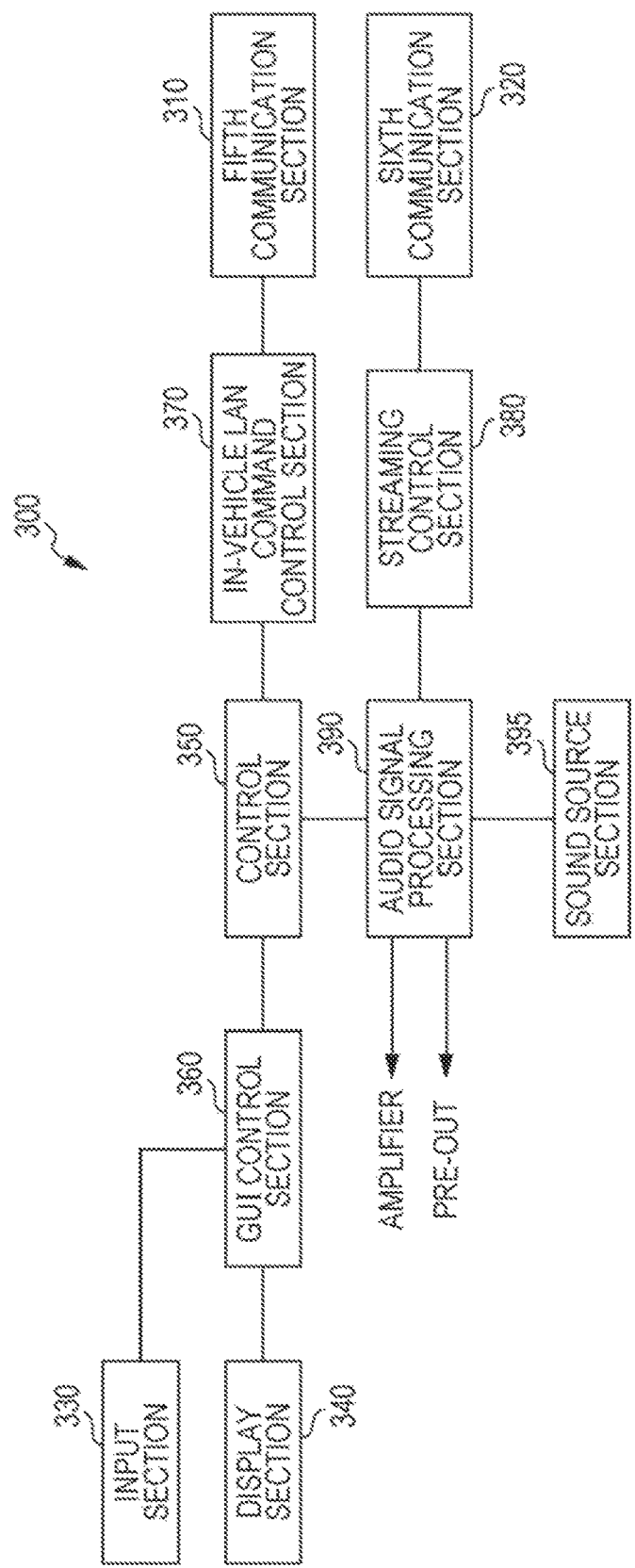
FIG. 5 is a block diagram illustrating a configuration of a car audio apparatus according to the first embodiment.

Next, a description will be given of the configuration of the car audio apparatus 300 as an in-vehicle apparatus with reference to FIG. 5. FIG. 5 is a block diagram illustrating the configuration of the car audio apparatus 300. The car audio apparatus 300 is an apparatus capable of playing back an audio content. The car audio apparatus 300 includes a fifth communication section 310, a sixth communication section 320, an input section 330, a display section 340, a control section 350, a GUI control section 360, an in-vehicle LAN command control section 370, a streaming control section 380, an audio signal processing section 390, and a sound source section 395.

The fifth communication section 310 is a CAN communication module for performing communication with the CAN bus of the in-vehicle LAN. The fifth communication section 310 performs communication with the gateway apparatus 200 through the CAN bus.

The sixth communication section 320 is a communication module that performs data transmission and reception with the terminal apparatus 100 using a predetermined communication method. The communication method includes, for example Bluetooth, Wi-Fi, a wireless LAN, a 3G network, LTE, and so on. In this regard, in the present embodiment, a description will be given on the assumption that the sixth communication section 320 performs communication with the terminal apparatus 100 using Bluetooth.

In this regard, the communication method is not limited to one of these wireless communication methods, and may be a wired communication, such as a USB connection, a LAN cable connection, or the like. Also, as long as a method enables data communication, any method other than the above-described communication method may be employed. In this manner, the car audio apparatus 300 has the CAN communication function and the wired and/or wireless communication function.

The input section 330 is an input mechanism for the user to perform various kinds of input to the car audio apparatus 300. For example, the input section 330 is formed by a button, a touch panel, a switch, or the like. Also, the input section 330 may be formed as a touch screen, which is integrated with the display section 340. When a user performs input operation on the input section 330, the input section 330 generates a control signal corresponding to the input, and outputs the control signal to the control section 350. And the control section 350 performs calculation processing and control which corresponds to the control signal.

The display section 340 is a display mechanism constituted by, for example an LCD, a PDP, an organic EL panel, or the like. On the display section 340, a home screen on which a menu of various operations of the car audio apparatus 300 is displayed, a content list, information (an artist name, a music name, and so on) on an audio content being played back, a moving image content, an image content, and the like are displayed.

The control section 350 includes, for example, a CPU, a RAM, a ROM, and the like. The ROM stores a program that is read and operated by the CPU, and the like. The RAM is used for a work memory of the CPU. The CPU performs various kinds of processing in accordance with the program stored in the ROM so as to control the entire car audio apparatus 300, and individual sections thereof. When the control section 350 receives a command transmitted from the terminal apparatus 100 through the gateway apparatus 200, the control section 350 changes the mode of the car audio apparatus 300 to the streaming playback mode in which streaming playback is performed. Also, at that time, the input sound source of the streaming playback is changed to a predetermined sound source. In the present embodiment, in order to play back the content transmitted from the second communication section 120 of the terminal apparatus 100, the input sound source is changed to Bluetooth so as to correspond to the second communication section 120 of the terminal apparatus 100.

The GUI control section 360 generates a GUI menu for combining various kinds of images to be displayed on the display section 340, and supplies the GUI menu to the display section 340. Thereby, various kinds of menus, and icons, and so on are displayed on the display section 340 in order for the user to use the present technique.

The in-vehicle LAN command control section 370 performs predetermined processing on the command data for causing the car audio apparatus 300 to make a transition to the streaming playback mode, which has been received through the CAN of the in-vehicle LAN, and supplies the command data to the control section 350. Also, the in-vehicle LAN command control section 370 performs the function of transmitting command data on the in-vehicle LAN all the time in order to indicate the state of the car audio apparatus 300 itself.

The streaming control section 380 converts the content data, which was transmitted from the terminal apparatus 100 and received by the sixth communication section 320, into an audio signal, and supplies the content data to the audio signal processing section 390. In this manner, the car audio apparatus 300 has a function of playing back the content transmitted from an external apparatus using streaming.

The audio signal processing section 390 performs necessary processing, such as Digital/Analog (D/A) conversion, amplification, and the like on the audio signal supplied from the streaming control section 380, and supplies the audio signal to an external amplifier, a pre-out, and the like. And sound is output from a speaker that is connected to the amplifier or the pre-out.

The sound source section 395 outputs an audio content of an optical disc player, a radio, or the like, such as a Compact Disc (CD), a Digital Versatile Disc (DVD), Blu-ray, and so on, for example. In this regard, in the present embodiment, a content played back by the car audio apparatus 300 is an audio content, such as music, and the like. However, the content is not limited to an audio content, and the other contents, such as a moving image content, an image content, and so on may be played back.

The car audio apparatus 300 is configured as described above. In this regard, in the present embodiment, it is assumed that the communication between the terminal apparatus 100 and the gateway apparatus 200 is performed using Wi-Fi. Also, it is assumed that transmission and reception of content data between the terminal apparatus 100 and the car audio apparatus 300 is performed using Bluetooth. However, the communication method is not limited to those. The communication between the gateway apparatus 200 and the car audio apparatus 300 is performed using a CAN bus.

Figure 6:
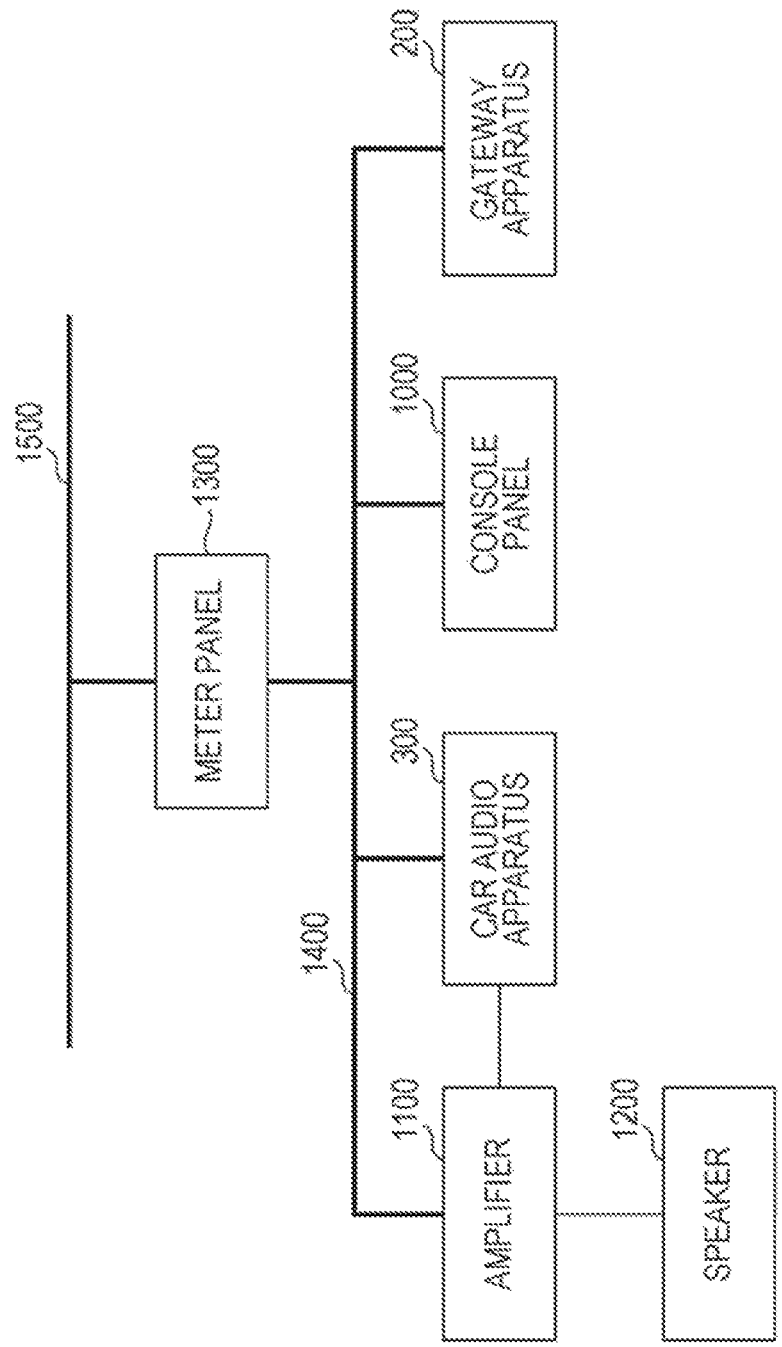
FIG. 6 is a block diagram illustrating a connection mode between a car audio apparatus and the other apparatuses installed in a vehicle using a CAN bus.

FIG. 6 is a block diagram illustrating a connection mode between the car audio apparatus 300 and the other apparatuses installed in a vehicle. In the vehicle, apparatuses that are mainly related to content playback, such as an amplifier 1100, a car audio apparatus 300, a console panel 1000, a gateway apparatus 200, and the like are connected to a first CAN bus 1400. And the first CAN bus 1400 is connected to a meter panel 1300.

A second CAN bus 1500, which is different from the first CAN bus 1400, is connected to the meter panel 1300. Apparatuses and equipment that are related to running of a vehicle, such as an engine, gears, doors, lights, and so on are connected to the second CAN bus 1500. However, those apparatuses and equipment are not directly related to the present technique, and thus their illustrations in FIG. 6 and the descriptions will be omitted. In such a connection mode, the meter panel 1300 serves a function of a gateway.

Also, an amplifier 1100 is connected to the car audio apparatus 300. Further, the amplifier 1100 is connected to a speaker 1200. An audio signal supplied from the car audio apparatus 300 to the amplifier 1100 is amplified by the amplifier 1100, and is supplied to the speaker 1200 so as to be output as sound.

The car audio apparatus 300 is configured as described above.

1.5 Processing in Content Playback System

Figure 7:
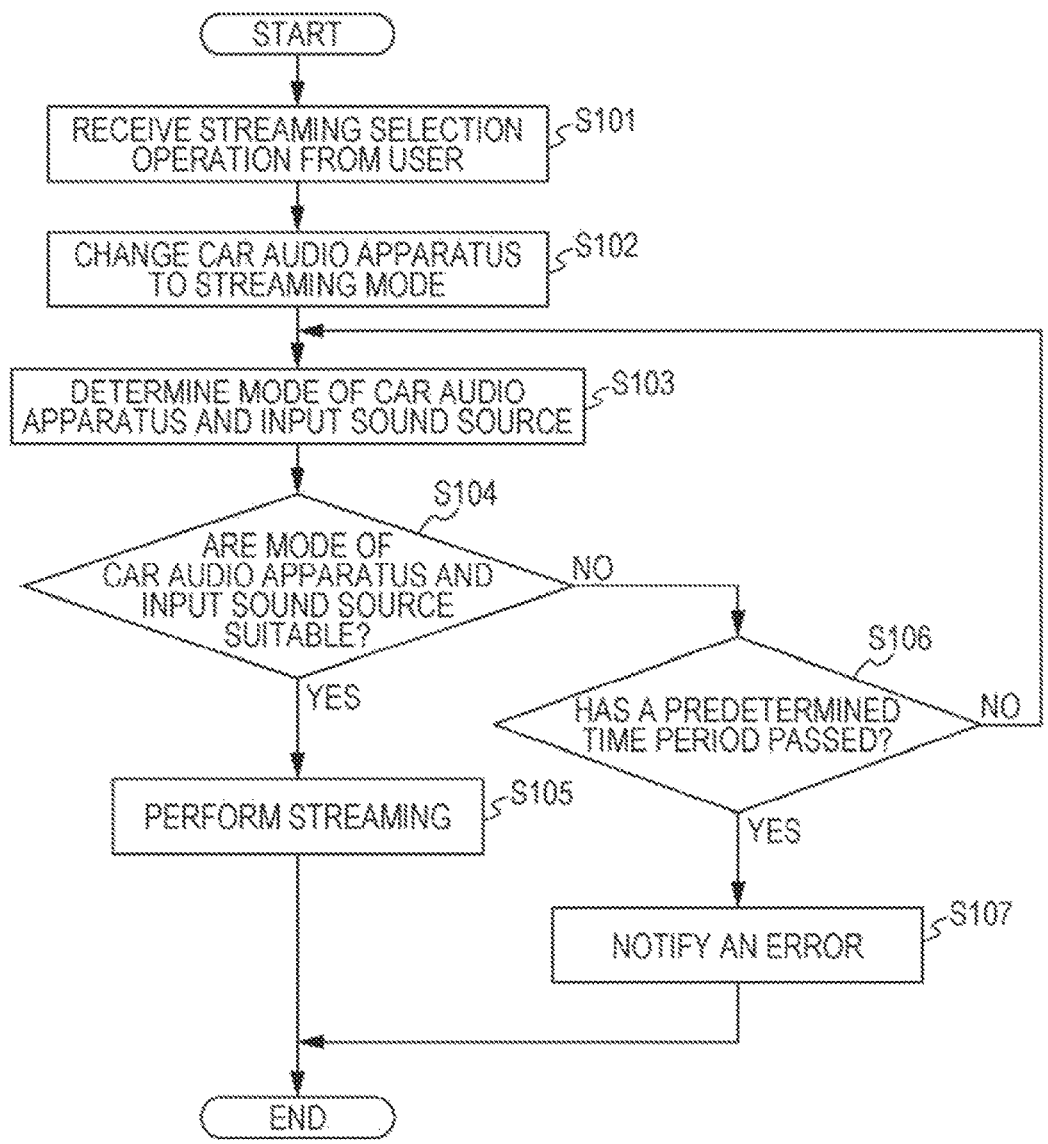
FIG. 7 is a flowchart illustrating a processing flow according to the first embodiment of the present technique.

Next, a description will be given of processing in the content playback system 10. FIG. 7 is a flowchart illustrating a processing flow in the content playback system 10. In this regard, it is assumed that authentication, pairing, and the like for communication among the terminal apparatus 100, the gateway apparatus 200, and the car audio apparatus 300 have been carried out in advance.

First, in step S101, the input section 140 of the terminal apparatus 100 receives operation of selecting the streaming playback mode from a user. A control signal in accordance with the input by the user is transmitted from the input section 140 to the application control section 161, and the terminal apparatus 100 operates in the streaming playback mode under the control of the application control section 161.

Next, in step S102, the terminal apparatus 100 transmits the command to the gateway apparatus 200 so as to transmit the command to the car audio apparatus 300 through the gateway apparatus 200. By receiving this command, the control section 350 of the car audio apparatus 300 changes the car audio apparatus 300 to the streaming playback mode for playing back the content transmitted from the terminal apparatus 100.

Next, in step S103, the state determination section 166 of the terminal apparatus 100 determines whether the car audio apparatus 300 has been changed to the streaming playback mode, and an input sound source of the streaming playback mode has been selected suitably. For example, if the terminal apparatus 100 and the car audio apparatus 300 are connected through Bluetooth, a determination is made of whether Bluetooth has been selected as the streaming input sound source. As described above, it is possible to confirm this by the terminal apparatus 100 monitoring communication on the CAN bus through the gateway apparatus 200.

By the determination in step S103, if confirmed that the mode of the car audio apparatus 300 and the input sound source are suitable, the processing proceeds from step S104 to step S105 (Yes in step S104).

And in step S105, the terminal apparatus 100 executes streaming of the content to the car audio apparatus 300. The streaming data is directly transmitted from the terminal apparatus 100 to the car audio apparatus 300 using Bluetooth without passing through the gateway apparatus 200. Thereby, it becomes possible to play back the content stored in the terminal apparatus 100 by the car audio apparatus 300.

On the other hand, if determined that Bluetooth has not been selected as the input sound source in the car audio apparatus 300 by the determination in step S103, the processing proceeds from step S104 to step S106 (No in step S104).

Next, in step S106, a determination is made of whether a predetermined time period has passed or not. A clock function that is usually provided in the terminal apparatus, or the like ought to be used for timekeeping. If the predetermined time period has not passed, the processing proceeds to step S103, a determination is made of again whether the car audio apparatus 300 is in the streaming playback mode, and Bluetooth is selected as the input sound source.

On the other hand, if determined that the predetermined time period has not passed in step S106, the processing proceeds to step S107 (Yes in step S106). And in step S107, the application control section 161 of the terminal apparatus 100 notifies an error to the user. The error is notified because the car audio apparatus 300 has not been changed to the streaming playback mode after the elapse of the predetermined time period, and thus some trouble might have occurred in any one of the apparatuses or the network. Accordingly, the error is notified to the user.

For a method of notifying the error, it is thought that a character string, an image, an icon, or the like is displayed on the display section 150 under the control of the GUI control section 162, or a sound message is output from a speaker included in the terminal apparatus 100, and so on. The display on the display section 150 and the sound message may be used at the same time. In this regard, an error may be notified at both the terminal apparatus 100 and the car audio apparatus 300, or may be notified at either one of the apparatuses.

The processing in the first embodiment is performed as described above. By the first embodiment, it becomes possible to change the mode of the car audio apparatus 300 only by operating the terminal apparatus 100 without directly operating the car audio apparatus 300.

Usually, the operation panel of the car audio apparatus 300 is disposed at the front seat side, and thus it is difficult for a person seated in the rear seat in a vehicle to operate the operation panel, or it is necessary for the person to lean forward in order to operate the operation panel, which is inconvenient. Thus, using the technique according to the present embodiment, it is possible for a person seated in a rear seat to change the mode of the car audio apparatus 300 by operating the terminal apparatus 100 without directly operating the car audio apparatus 300, and thus it becomes possible to easily play back the content.

Also, the gateway apparatus 200 performs only the transmission and reception of command data, and does not perform transmission and reception of content data. It is therefore not necessary to demand high performance of the gateway apparatus 200. Accordingly, the gateway apparatus will not become expensive. Otherwise, an increased price of the gateway apparatus is caused by an increase in performance of the gateway apparatus 200. Also, it is not necessary for the gateway apparatus to have high performance, and thus it is possible to support a high-quality sound and a high-quality image of a content in the future without changing the existing gateway apparatuses.

2. Second Embodiment 2.1 Configuration of Terminal Apparatus

Figure 8:
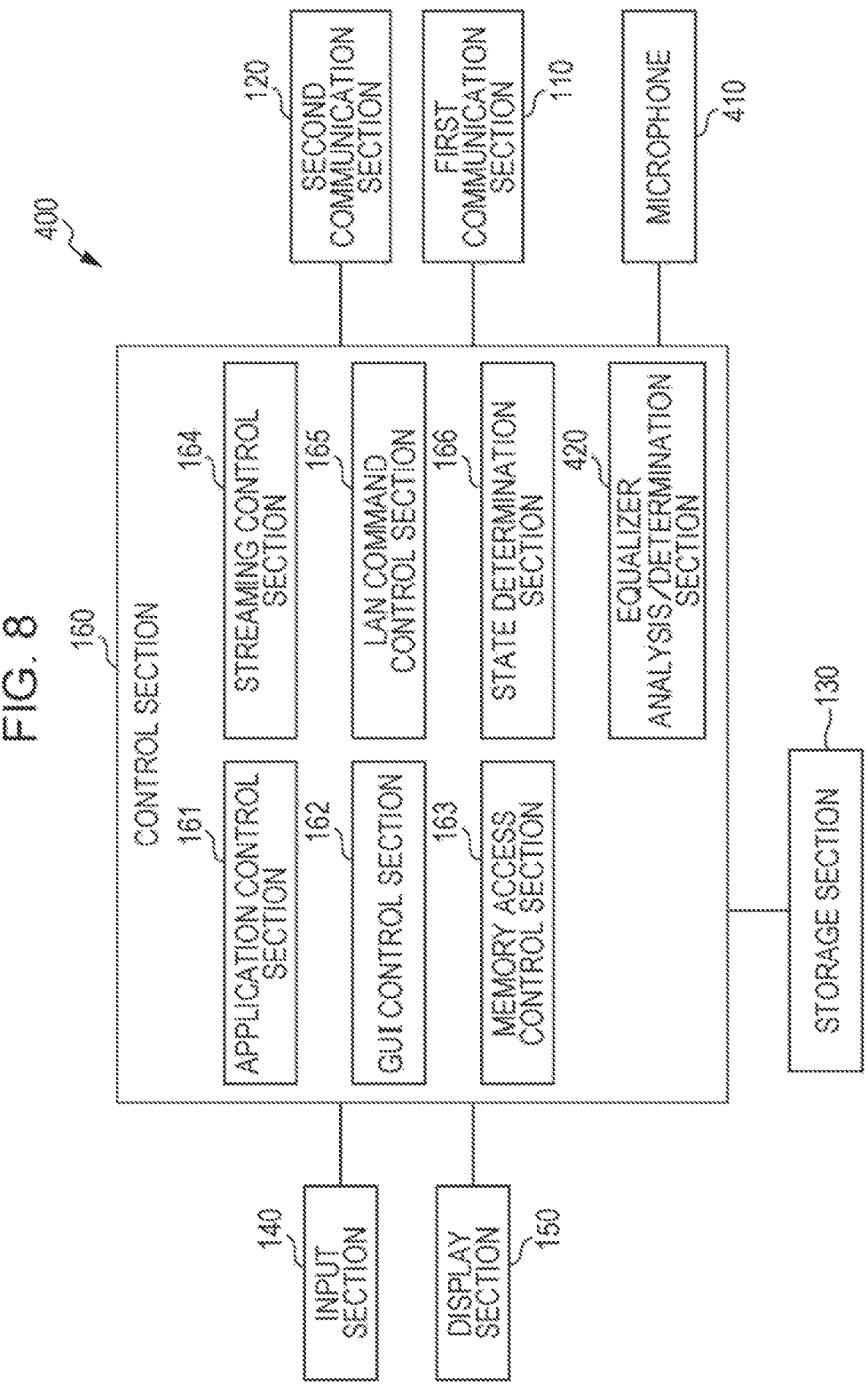
FIG. 8 is a block diagram illustrating a configuration of a terminal apparatus according to a second embodiment of the present technique.

Next, a description will be given of a second embodiment of the present technique. FIG. 8 is a block diagram illustrating a configuration of a terminal apparatus 400 according to the second embodiment of the present technique. The terminal apparatus 400 according to the second embodiment is different from the first embodiment in the point of being provided with a microphone 410 and an equalizer analysis/determination section 420. The other components are the same as those of the first embodiment, and thus the descriptions thereof are omitted.

The microphone 410 is an audio input mechanism for inputting sound to the terminal apparatus 400. The sound input into the microphone 410 is converted into an analog audio signal, and is supplied to the equalizer analysis/determination section 420.

The equalizer analysis/determination section 420 analyzes the audio signal input from the microphone 410, and determines a suitable equalizer setting at the time of playing back a content. For a suitable equalizer setting, for example, if a low frequency range not higher than about 100 Hz has a predetermined value or more, the gain for a frequency not higher than 100 Hz is decreased by a certain amount. Also, if the low frequency range has a predetermined value or less, the gain for the low frequency range is increased by a certain amount, and so on. This is the same for a high frequency range, and a medium frequency range. Also, a large number of pre-set values for equalizer setting are stored in a car audio apparatus 500 in advance, and a pre-set value may be selected to match an analysis result of an input sound so as to determine an equalizer setting.

The determined equalizer setting information is transmitted from the terminal apparatus 400 to the gateway apparatus 200, and is transmitted to the car audio apparatus 500 through the gateway apparatus 200. When the car audio apparatus 500 receives the equalizer setting information, the car audio apparatus 500 performs its own equalizer adjustment in accordance with the equalizer setting information.

Also, in the second embodiment, the state determination section 166 monitors communication on the CAN bus through the gateway apparatus 200 to obtain the state of the car audio apparatus 500 so as to grasp the state of the equalizer. And the state determination section 166 compares the grasped state of the equalizer, and the equalizer setting value calculated by the equalizer analysis/determination section 420 so as to determine whether the equalizer of the car audio apparatus 500 has been properly set or not.

2.2 Configuration of Car Audio Apparatus

Figure 9:
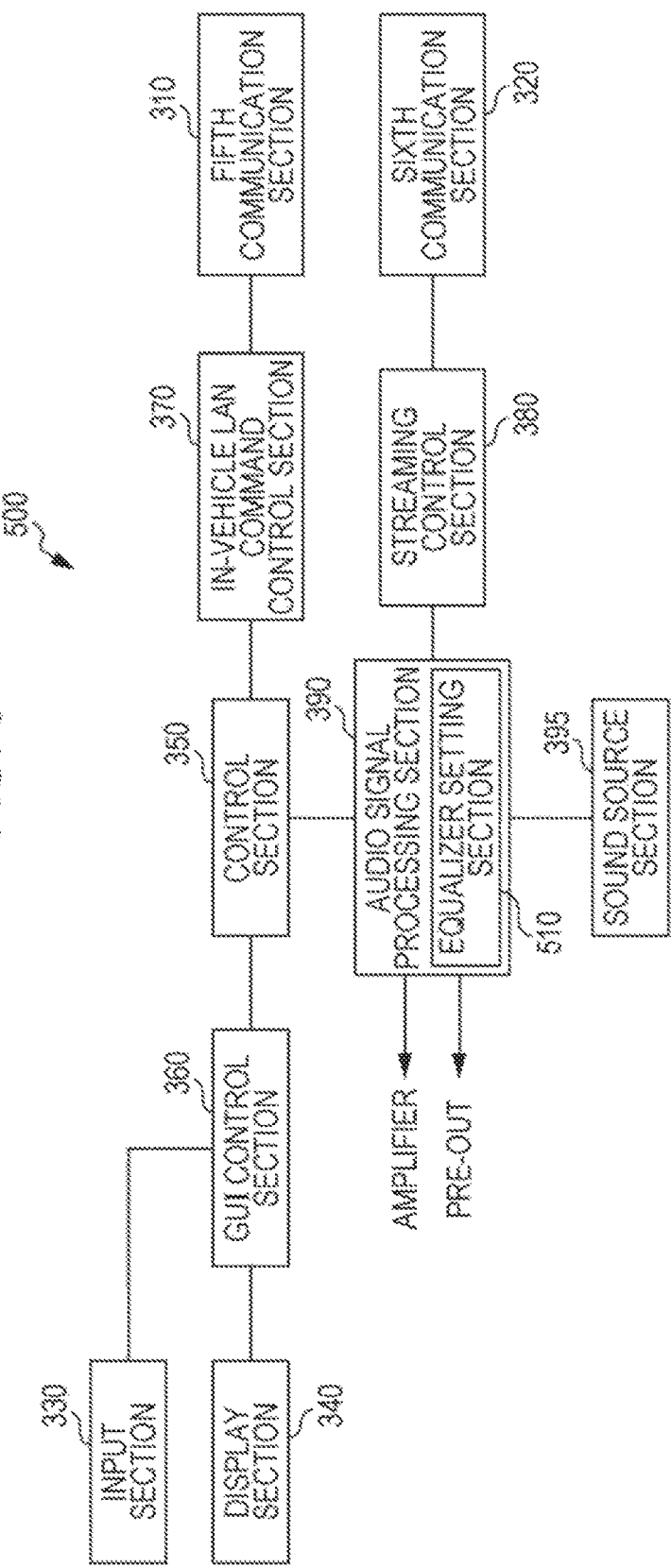
FIG. 9 is a block diagram illustrating a configuration of a car audio apparatus according to the second embodiment of the present technique.

Next, a description will be given of the car audio apparatus 500 according to a second embodiment. FIG. 9 is a block diagram illustrating a configuration of the car audio apparatus 500 according to the second embodiment. The car audio apparatus 500 in the second embodiment is different from the first embodiment in the point of being provided with an equalizer setting section 510. The other components are the same as those of the first embodiment, and thus the description thereof are omitted.

The equalizer setting section 510 performs setting of the equalizer in the audio signal processing section 390 on the basis of the equalizer setting information transmitted from the terminal apparatus 400 through the gateway apparatus 200. Thereby, it is possible for the car audio apparatus 500 to play back sound by the equalizer setting calculated by the terminal apparatus 400.

2.3 Processing in Content Playback System

Figure 10:
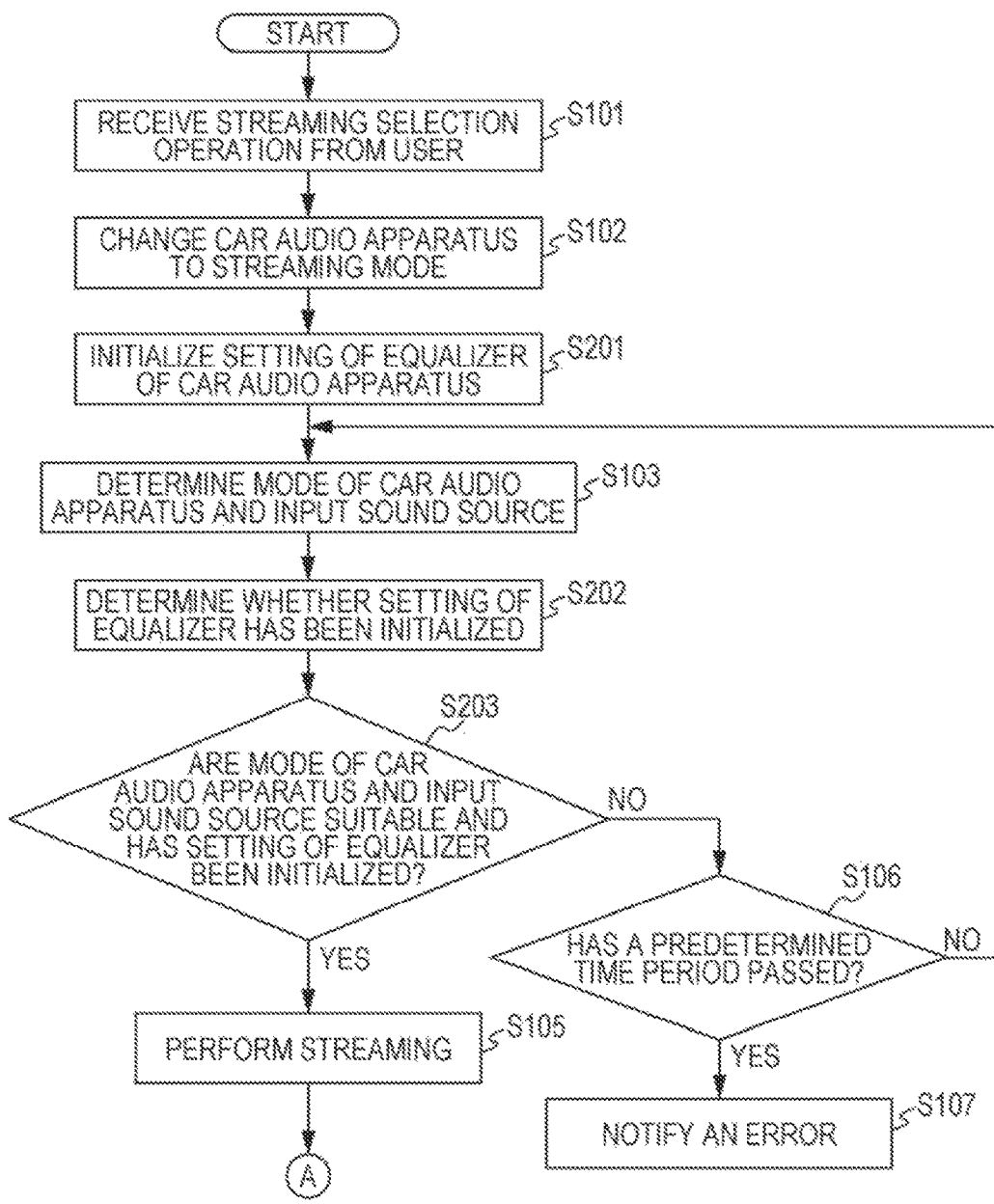
FIG. 10 is a flowchart illustrating a processing flow according to the second embodiment of the present technique.
Figure 11:
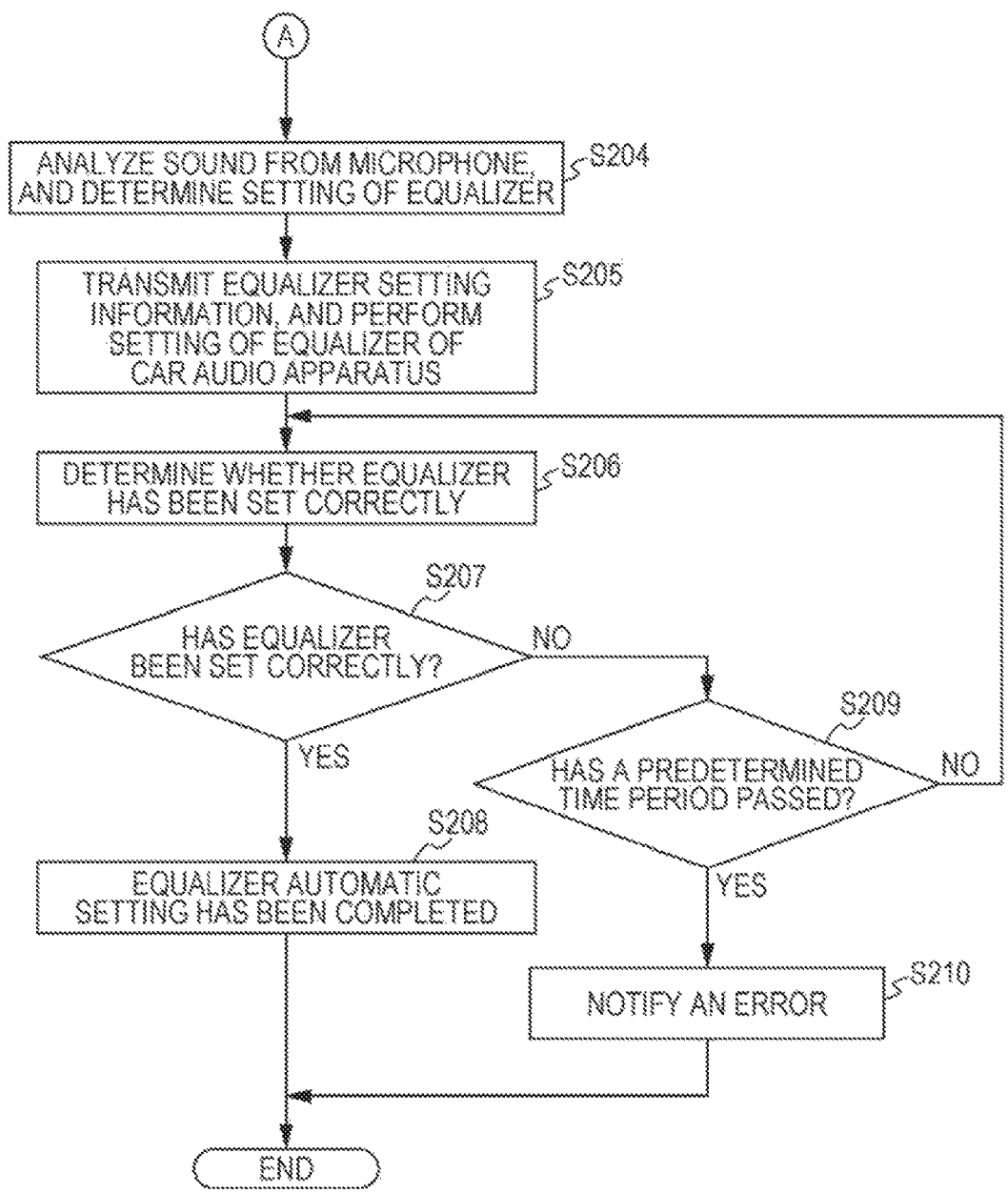
FIG. 11 is a flowchart illustrating a processing flow according to the second embodiment of the present technique.

Next, a description will be given of processing in the content playback system 10 according to the second embodiment with reference to the flowcharts in FIG. 10 and FIG. 11. The same step number is given to the same processing as that in the first embodiment, and the detailed description thereof is omitted.

After the processing in step S101 and step S102, in step S201, the terminal apparatus 400 transmits the command data for initializing the equalizer setting of the car audio apparatus 500 to the car audio apparatus 500 through the gateway apparatus 200. By receiving this command data, the equalizer setting section 510 of the car audio apparatus 500 initializes the equalizer setting of the car audio apparatus 500.

Next, in step S103, the state determination section 166 of the terminal apparatus 400 determines whether the car audio apparatus 500 has been changed to the streaming playback mode, and an input sound source of the streaming playback mode has been selected suitably. Further, the state determination section 166 determines whether the equalizer setting of the car audio apparatus 500 has been returned to the initial state. As described above, the car audio apparatus 500 notifies the state of itself on the CAN bus all the time. Accordingly, it is possible for the terminal apparatus 400 to check the equalizer setting of the car audio apparatus 500 by monitoring communication on the CAN bus through the gateway apparatus 200 in the same manner as the determination of the mode of the car audio apparatus 500.

And if the mode of the car audio apparatus 500 is the streaming playback mode, Bluetooth is selected as the input sound source, and further the setting of the equalizer has been initialized, the processing proceeds from step S203 to step S105 (Yes in step S203). Next, in step S105, streaming from the terminal apparatus 400 to the car audio apparatus 500 is executed using Bluetooth.

On the other hand, if any one of the cases that the car audio apparatus 500 is in the streaming playback mode, that Bluetooth is selected as an input sound source, and that the setting of the equalizer has been initialized has not occurred, the processing proceeds from step S203 to step S106 (No in step S203).

And if the result of a determination in step S106 of whether a predetermined time period has passed is Yes, the terminal apparatus 400 notifies an error to the user in step S107. This error notification is carried out in the same manner as the first embodiment, and thus the error is notified by a display on the display section 150 and a sound message, or the like.

When the streaming is executed in step S105, next, in step S204, the equalizer analysis/determination section 420 of the terminal apparatus 400 determines the equalizer setting on the basis of the input sound from the microphone 410.

And the determined equalizer setting information is transmitted to the gateway apparatus 200, and is transmitted to the car audio apparatus 500 through the gateway apparatus.

And in step S205, the equalizer setting section 510 of the car audio apparatus 500 performs the equalizer setting of the car audio apparatus 500 on the basis of the received equalizer setting information.

Next, in step S206, the terminal apparatus 400 monitors communication on the CAN bus through the gateway apparatus 200 so as to determine whether the equalizer setting of the car audio apparatus 500 has been performed properly. And if the equalizer of the car audio apparatus 500 has been set properly, the processing proceeds from step S207 to step S208 (Yes in step S207).

And in step S208, the setting of the equalizer has been completed, and the processing is terminated. On the other hand, if the equalizer of the car audio apparatus 500 is not properly set, the processing proceeds from step S207 to step S209 (No in step S207).

Next, in step S209, a determination is made of whether a predetermined time period has passed or not. If the predetermined time period has not passed, the processing proceeds to step S206, and a determination is made again of whether the equalizer of the car audio apparatus 500 has been set properly or not.

On the other hand, in step S209, if determined that a predetermined time period has passed, the processing proceeds to step S210 (Yes in step S209). And in step S210, the application control section 161 of the terminal apparatus 400 notifies an error to the user. If the equalizer of the car audio apparatus 500 is not properly set after a predetermined time period passed, some trouble might have occurred in any one of the apparatuses or a network. The error notification is given to the user in order to inform this occurrence.

For a method of notifying the error, it is thought that a character string, an image, an icon, or the like is displayed on the display section 150, or a sound message is output from a speaker included in the terminal apparatus 400, and so on. The display on the display section 150 and the sound message may be used at the same time.

The processing in the second embodiment is performed as described above. By the second embodiment, it is possible to set the equalizer at the time of playing back a content in accordance with ambient sound collected by the microphone 410, and thus it is possible to play back the content with better sound quality.

Also, the determination of the equalizer setting is carried out by the terminal apparatus 400, and thus it is not necessary to make a change to the gateway apparatus 200 and the car audio apparatus 500. It is possible to use those apparatuses in a related-art state without change.

Further, the equalizer setting information determined by the terminal apparatus 400 is transmitted to the car audio apparatus 500 through the gateway apparatus 200, and thus it is not necessary to directly operate the car audio apparatus 500 in order to set the equalizer setting. Accordingly, it is possible for a user seated away from the car audio apparatus 500 to carry out equalizer setting, and to play back a content.

3. Third Embodiment 3.1 Configuration of Terminal Apparatus

Figure 12:
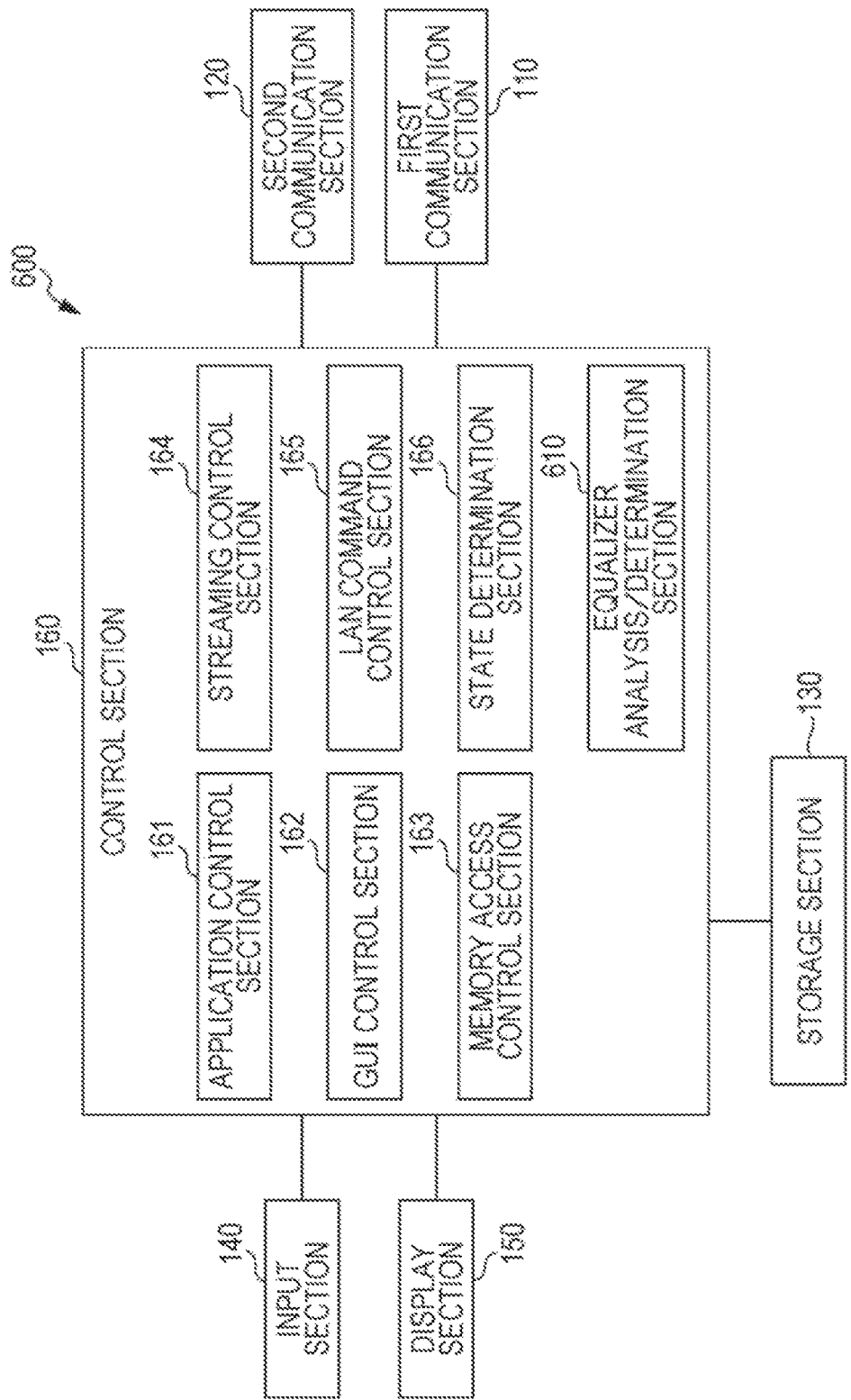
FIG. 12 is a block diagram illustrating a configuration of a terminal apparatus according to a third embodiment of the present technique.

Next, a description will be given of a third embodiment of the present technique. FIG. 12 is a block diagram illustrating a configuration of a terminal apparatus according to the third embodiment. The terminal apparatus 600 according to the third embodiment is different from the first embodiment in the point of being provided with an equalizer analysis/determination section 610. The other components are the same as those of the first embodiment, and thus the descriptions thereof are omitted.

The equalizer analysis/determination section 610 performs publicly noted sound analysis processing on streaming data, and obtains the frequency characteristic of a content. And the equalizer analysis/determination section 610 determines the equalizer setting on the basis of the frequency characteristic information. For an equalizer setting, for example, if a low frequency range not higher than about 100 Hz has a predetermined value or more, the gain for a frequency not higher than 100 Hz is decreased by a certain amount. Also, if the low frequency range has a predetermined value or less, the gain for the low frequency range is increased by a certain amount, and so on. This is the same for a high frequency range, and a medium frequency range. Also, a large number of pre-set values for equalizer setting are stored in a car audio apparatus 500 in advance, and a pre-set value may be selected to match an analysis result of an input sound so as to determine an equalizer setting.

The calculated equalizer setting information is transmitted to the car audio apparatus 500 through the gateway apparatus 200 in the same manner as the second embodiment. The configuration of the car audio apparatus 500 is the same as that in the second embodiment. The equalizer setting section 510 of the car audio apparatus 500 sets the equalizer in the audio signal processing section 390 on the basis of the equalizer setting information transmitted from the terminal apparatus 600 through the gateway apparatus. Thereby, it is possible for the car audio apparatus 500 to play back a content with sound adjusted by the equalizer setting calculated by the terminal apparatus 600.

The terminal apparatus 600 according to the third embodiment is configured as described above. In this regard, the configurations of the gateway apparatus 200 and the car audio apparatus 500 are the same as those in the second embodiment, and thus the description thereof will be omitted.

3.2 Processing in Content Playback System

Figure 13:
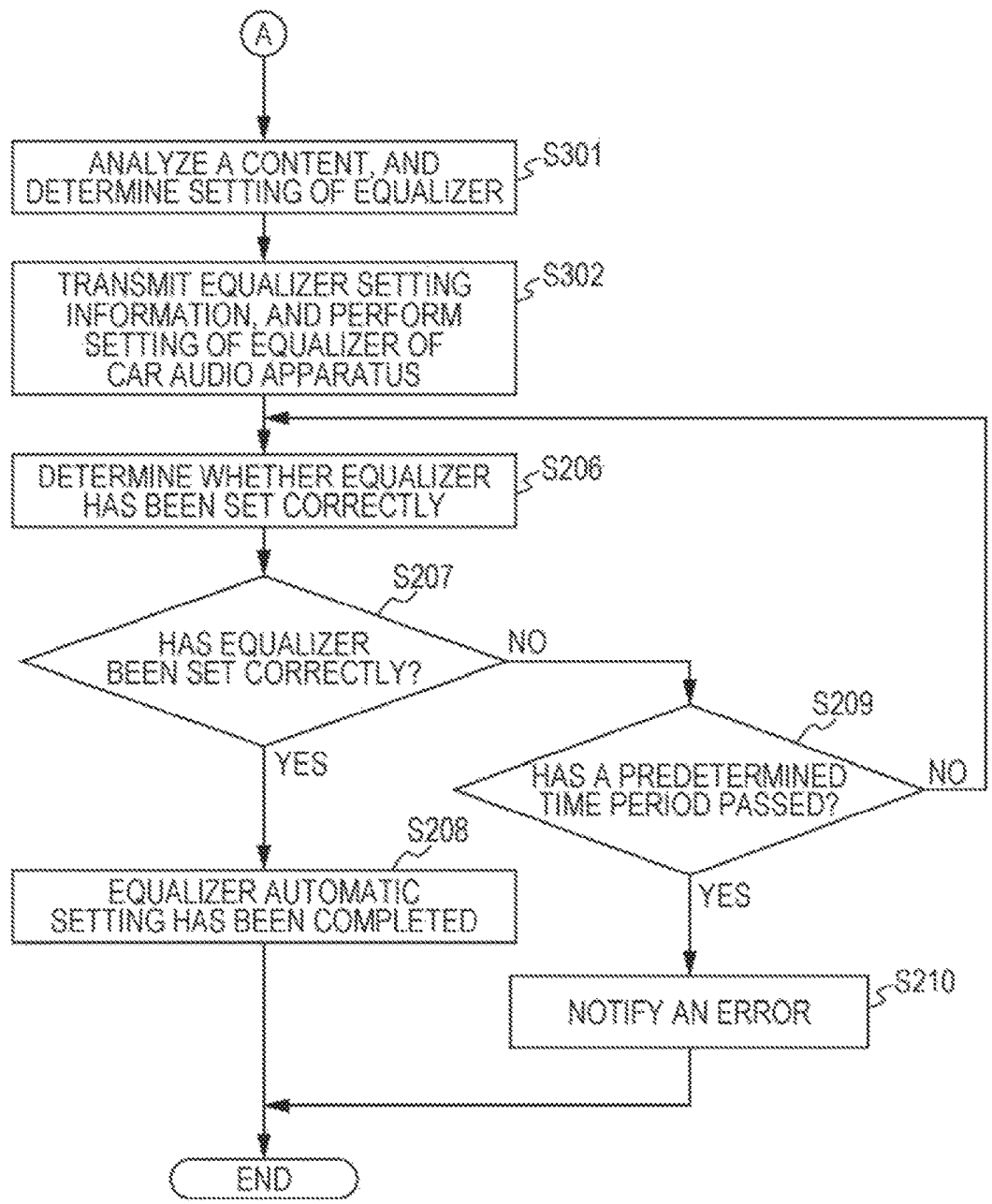
FIG. 13 is a flowchart illustrating a processing flow according to the third embodiment of the present technique.

Next, a description will be given of processing in a content playback system according to a third embodiment with reference to flowcharts in FIG. 10 and FIG. 13. The same step number is given to the same processing as that in the first embodiment or the second embodiment, and the detailed description thereof is omitted. The flowchart in FIG. 10, which illustrates the processing in the second embodiment, is the same as that in the third embodiment, and thus the description will be given from step S301 in FIG. 13.

In step S301, the equalizer analysis/determination section 610 of the terminal apparatus 600 analyzes the sound of the content data transmitted from the terminal apparatus 600 to the car audio apparatus 500, and determines the equalizer setting. Next, in step S302, the equalizer setting information is transmitted to the car audio apparatus 500 through the gateway apparatus 200. And the equalizer setting section 510 of the car audio apparatus 500 performs the equalizer setting on the basis of the equalizer setting information. The processing from step S206 to step S210 is the same as the processing in the second embodiment.

The processing in the third embodiment is performed as described above. By the third embodiment, it is possible to set the equalizer at the time of playing back a content in accordance with the acoustic characteristic of a content, and thus it is possible to play back a content with good sound quality.

4. Variations

In the above, descriptions have been specifically given of the embodiments of the present techniques. However, the present technique is not limited to the above-described embodiments. It is possible to make various alterations without departing from the spirit and scope of the present technique. It is possible to configure the present technique as follows.

(1) A terminal apparatus including: by way of a gateway apparatus configured to perform communication with an in-vehicle apparatus capable of playing back a content through a CAN bus, a first communication section configured to transmit command information for changing a mode of the in-vehicle apparatus to the in-vehicle apparatus; and a second communication section configured to transmit content data to the in-vehicle apparatus.

(2) The terminal apparatus according to (1), wherein the command information changes the in-vehicle apparatus to a mode for playing back the content data.

(3) The terminal apparatus according to (1) or (2), further including a state determination section configured to determine whether the in-vehicle apparatus has been changed to a mode for playing back the content data.

(4) The terminal apparatus according to (3), wherein the state determination section determines whether a mode of the in-vehicle apparatus has been changed by monitoring communication of the in-vehicle apparatus on the CAN bus by way of the gateway apparatus.

(5) The terminal apparatus according to any one of (1) to (4), wherein the first communication section performs communication with the gateway apparatus through wireless communication.

(6) The terminal apparatus according to any one of (1) to (5), wherein the second communication section performs communication with the in-vehicle apparatus through wireless communication.

(7) The terminal apparatus according to any one of (1) to (6), further including an equalizer setting determination section configured to determine setting of an equalizer when input sound is analyzed and the content data is played back, wherein the first communication section transmits equalizer setting information determined by the equalizer setting determination section to the in-vehicle apparatus by way of the gateway apparatus.

(8) The terminal apparatus according to (7), further including a microphone configured to input sound, wherein the equalizer setting determination section analyzes the sound input from the microphone, and determines the equalizer setting.

(9) The terminal apparatus according to (7), wherein the equalizer setting determination section analyzes the content data, and determines the equalizer setting.

(10) A method of transmitting a content, the method including: by way of a gateway apparatus configured to perform communication with an in-vehicle apparatus capable of playing back a content through a CAN bus, transmitting command information for changing a mode of the in-vehicle apparatus to the in-vehicle apparatus; and transmitting content data to the in-vehicle apparatus.

(11) A content transmission program for causing a computer to perform a method of transmitting a content, the method including: by way of a gateway apparatus configured to perform communication with an in-vehicle apparatus capable of playing back a content through a CAN bus, transmitting command information for changing a mode of the in-vehicle apparatus to the in-vehicle apparatus; and transmitting content data to the in-vehicle apparatus.

(12) A content playback system including: a terminal apparatus including to a gateway apparatus configured to perform communication with an in-vehicle apparatus capable of playing back a content through a CAN bus, a first communication section configured to transmit command information for changing a mode of the in-vehicle apparatus, and a second communication section configured to transmit content data to the in-vehicle apparatus; a gateway apparatus configured to transmit the command information transmitted from the terminal apparatus to the in-vehicle apparatus; and an in-vehicle apparatus configured to play back the content data transmitted from the terminal apparatus.

What is claimed is:

1. A terminal apparatus, comprising:
    a first communication section configured to transmit command information, to change a mode of an in-vehicle apparatus, wherein the in-vehicle apparatus is configured to play-back content, and wherein the first communication section is configured to transmit the command information by use of a gateway apparatus;
    a second communication section configured to transmit content data to the in-vehicle apparatus; and
    a state determination section configured to determine that the change of the mode of the in-vehicle apparatus is a mode to play back the content data.

2. The terminal apparatus according to claim 1, wherein the command information is to change the in-vehicle apparatus to the mode to play back the content data.

3. The terminal apparatus according to claim 1, wherein the gateway apparatus is configured to communicate with the in-vehicle apparatus through a Controller Area Network (CAN) bus.

4. The terminal apparatus according to claim 3, wherein the state determination section is further configured to monitor the communication of the in-vehicle apparatus through the CAN bus by the use of the gateway apparatus and determine the change of the mode of the in-vehicle apparatus based on the monitoring.

5. The terminal apparatus according to claim 1, wherein the first communication section is further configured to communicate with the gateway apparatus through a wireless communication.

6. The terminal apparatus according to claim 1, wherein the second communication section is further configured to communicate with the in-vehicle apparatus through a wireless communication.

7. The terminal apparatus according to claim 1, further comprising an equalizer setting determination section configured to determine setting information of an equalizer based on an analysis of a received sound and the content data,
    wherein the first communication section is further configured to transmit the setting information to the in-vehicle apparatus by use of the gateway apparatus.

8. The terminal apparatus according to claim 7, further comprising a microphone configured to receive sound, wherein the equalizer setting determination section is further configured to analyze the sound received from the microphone, and determine the setting information.

9. The terminal apparatus according to claim 7, wherein the equalizer setting determination section is further configured to analyze the content data, and determine the setting information.

10. The terminal apparatus according to claim 1, wherein based on determination that the mode of the in-vehicle apparatus remains same, the state determination section is further configured to continuously determine the change in the mode of the in-vehicle apparatus for a time period.

11. The terminal apparatus according to claim 10, wherein based on determination that the mode of the in-vehicle apparatus remained same within the time period, the terminal apparatus is further configured to notify an error message on a display to a user.

12. A method of transmitting content, the method comprising:
   in a terminal apparatus:
      communicating, by use of a gateway apparatus, with an in-vehicle apparatus configured to play back the content;
      transmitting command information, for changing a mode of the in-vehicle apparatus, to the in-vehicle apparatus;
      transmitting content data to the in-vehicle apparatus; and
      determining that the change of the mode of the in-vehicle apparatus is a mode for playing back the content data.

13. A non-transitory computer-readable medium having stored thereon, computer-executable instructions that when executed by a computer causes the computer to execute operations, the operations comprising:
   communicating, by use of a gateway apparatus, with an in-vehicle apparatus configured to play back content;
   transmitting command information, for changing a mode of the in-vehicle apparatus, to the in-vehicle apparatus;
   transmitting content data to the in-vehicle apparatus; and
   determining that the change of the mode of the in-vehicle apparatus is a mode for playing back the content data.

14. A content playback system, comprising:
a terminal apparatus which includes:
   a first communication section configured to transmit command information, to change a mode of an in-vehicle apparatus, wherein the in-vehicle apparatus is configured to play-back content, and wherein the first communication section is configured to transmit the command information by use of a gateway apparatus,
   a second communication section configured to transmit content data to the in-vehicle apparatus, and
   a state determination section configured to determine that the change of the mode of the in-vehicle apparatus is a mode to play back the content data; and
the gateway apparatus configured to transmit the command information from the terminal apparatus to the in-vehicle apparatus.

* * * * *